A. G. MAULE.
AUTOMATIC HOSE COUPLING
APPLICATION FILED JULY 1, 1912.
1,059,308.
Patented Apr. 15, 1913.
2 SHEETS—SHEET 2.
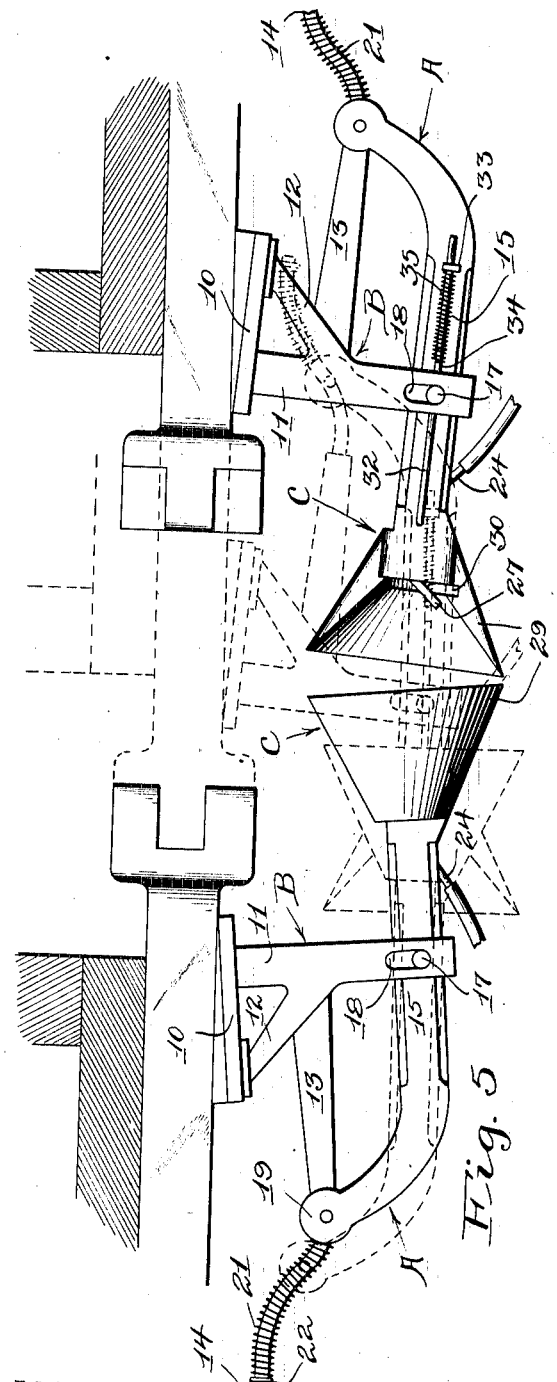
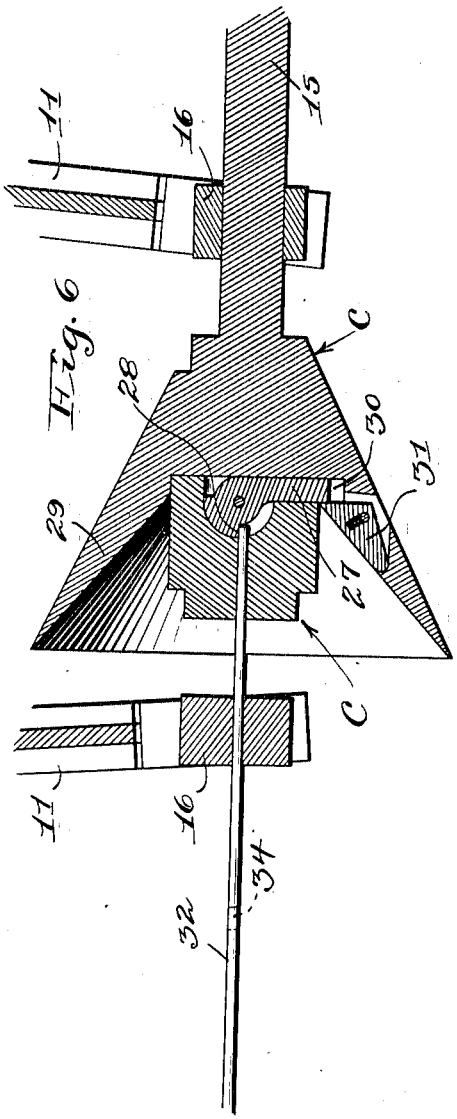
Witnesses
F. C. Caswell
F. M. Hardy
Inventor
Archie G. Maule
by John E. Stryker Atty.

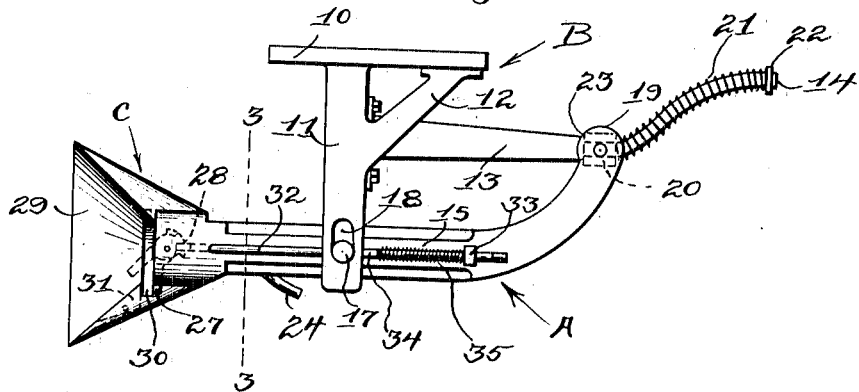
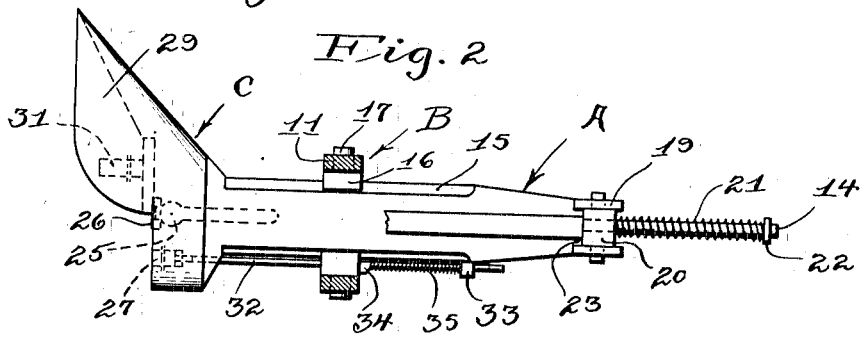
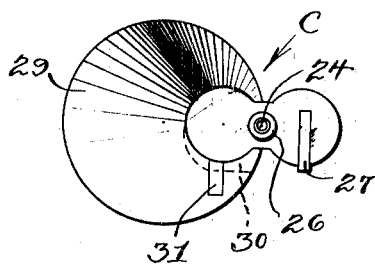
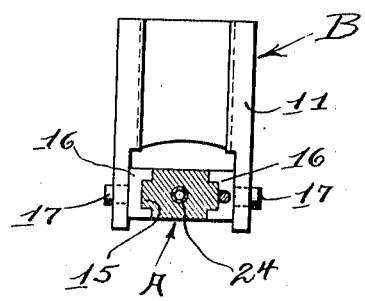

UNITED STATES PATENT OFFICE.

ARCHIE G. MAULE, OF SOUTH ST. PAUL, MINNESOTA.

AUTOMATIC HOSE-COUPLING.

1,059,308.  Specification of Letters Patent.  Patented Apr. 15, 1913.

Application filed July 1, 1912. Serial No. 707,125.

*To all whom it may concern:*

Be it known that I, ARCHIE G. MAULE, a citizen of the United States, residing at South St. Paul, in the county of Dakota and State of Minnesota, have invented new and useful Improvements in Automatic Hose-Couplers, of which the following is a specification.

My invention relates to improvements in hose couplings for railway cars and its object is to provide simple and durable means adapted to automatically couple and uncouple abutting hose sections beneath the cars of a train.

A further object is to provide a device of this class adapted to securely seal the joint between hose sections as the same are brought together.

My improved coupling comprises two identical coupler sections. One section is clearly illustrated by the accompanying drawings in which—

Figure 1 is a side elevation, Fig. 2, a plan view of the same partly broken away to show certain working parts, Fig. 3, a detail sectional view taken on the line 3—3 of Fig. 1, Fig. 4, a detail end elevation of the coupling head, Fig. 5 is a plan view showing in heavy lines two abutting coupler sections about to be coupled and in dotted lines said sections coupled together, and Fig. 6 is a detail sectional view illustrating the locking mechanism in said sections.

Referring to the drawings, I have used the reference letter A to indicate the body, B the hanger and C the coupling head of my device.

The hanger B consists of an anchor plate 10, a pair of vertically depending arms 11 on said plate, braces 12 extending from said arms to the plate, and a bracket 13 attached to said arms, said bracket being formed at its extremity with a curved and upwardly inclined guide 14.

The body A is tiltable vertically and slidable longitudinally on the hanger B. Ribs 15, formed on the central portion of said body, are slidable in the blocks 16, each of said blocks being provided with a stub bearing 17 mounted in the slot 18 of an arm 11. The rear end of the body A is curved upwardly and is formed with ears 19 at its extremity. The block 20, pivoted at its ends in said ears 19, is perforated to be supported by the guide 14. The spring 21, coiled about the guide 14, bears at one end against the block 20 and at its other end against the stop 22 on said guide and acts to yieldingly hold the body A in normal position with said block abutting against the shoulder 23 of the bracket 13, as illustrated in Fig. 1 of the drawings.

The coupling head C is formed on the forward end of the body A and is shown in detail in Fig. 4. The air pipe 24 passes from the center of the face of said head to a point below the body where it may be conveniently attached to an ordinary flexible hose. This pipe is formed with an enlargement 25 adapted to rest in a socket within the head C, said enlargement being designed to prevent the pipe 24 from moving rearwardly in said head. The gasket 26, surrounding the end of said pipe, is seated in the head C and extends slightly beyond its face. I have pivoted the dog 27 within one side of said head. This dog is formed at its upper end with a stop 28 and its other end extends downward, said end being adapted to rest flush with the face of the head C and with its extremity protruding slightly beneath said head. The bell-shaped guide 29 is formed on the head C at the side opposite the dog 27. Said guide is grooved at 30 to receive the dog of a companion coupling section and is supplied with a catch 31 to engage and retain said dog. The rod 32 is provided to engage the stop 28 on the dog 27 and lock the same in position as illustrated in heavy lines in Fig. 1. This rod is slidably mounted in the head C, the block 16 and the bearing 33, the latter being on the body A. Said rod 32 is supplied with a lug 34 adapted to engage said block 16 and also with a spring 35 arranged between said lug and the bearing 33 to normally and yieldingly hold said rod in engagement with the stop 28 of the dog 27.

In applying my improved couplings to cars, one section (as illustrated in Fig. 1) is attached by any suitable means to each draw bar of the cars. These sections are arranged in identical positions with the coupling heads C extending beyond the ends of the draw bars and with the faces of said heads slightly tilted so that in coupling, the lower edges of said faces will first impinge against each other.

In operation the coupling and uncoupling of the sections is automatic. When the sections are uncoupled the bodies A rest in the normal positions above described and the dogs 27 in the position illustrated in dotted lines in Fig. 1. As the cars are coupled the guides 29 of the abutting sections receive opposite sides of the heads C and direct the same into alinement with the openings of the pipes 24 and the gaskets 26. The dogs 27 engage the faces of the opposite heads and are moved to upright positions as said heads meet. The stops 28 at the upper ends of the dogs 27 are engaged and locked by their respective rods 32 and the lower ends of said dogs rest in the grooves 30 of the guides 29 and are engaged by the catches 31 which lock said sections together at the bases of their heads. Further movement of the cars toward each other forces the bodies A rearwardly on their hangers and moves them against the action of the springs 21. During this operation the bodies A are tilted by the guides 14 and this tilting movement brings the faces of the coupling heads together from bottom to top, thereby forcing the abutting gaskets together and forming a tight joint between the air pipes 24. Rearward movement of the bodies A upon their respective hangers B is arrested by contact of the draw bars of the cars. Compensation for vertical play between the cars is provided in the slotted connection between the body A and hanger B.

In uncoupling, the draw bars are disconnected and as the cars recede from each other the bodies A are forced back toward their normal positions by the springs 21 on the slides 14. During this movement the lugs 34 on the rods 32 engage their respective blocks 16 and withdraw said rods against the action of their springs 35, from engagement with the stops 31 on the dogs 27, thus freeing said dogs and permitting the separation of the heads as they reach normal positions on their hangers. As said heads are separated, the lower ends of the dogs 27 are carried by the catches 31 back to normal positions. I have pivoted these catches 31 in the guides 29 so that the former will yield to receive the dogs 27 and thereby prevent damage to said dogs and catches, in case the dogs are inadvertently moved to locked positions before the sections are coupled.

What I claim as new and desire to protect by Letters Patent, is:

1. A hose coupling for cars comprising two identical sections, each section consisting of a body formed with a coupling head, a hanger provided with an inclined guide, said body being slidable on said hanger and guide and provided with a passageway opening at the face of the head, a gasket in said head surrounding the opening of said passageway and a dog and catch on the head, said sections being adapted to be connected with each other by engagement of their dogs and catches and tilted by said guides to seal the joint between said gaskets.

2. A hose coupling for cars comprising two identical sections, each section consisting of a body formed with a coupling head, a hanger provided with an inclined guide, said body being slidable vertically and longitudinally on said hanger and guide and provided with a passageway extending therethrough and opening at the face of the head, a guide on one side of the head, a gasket in said head surrounding the opening of said passageway and a dog and catch on the head, said sections being adapted to be connected with each other by engagement of their dogs and catches and tilted by said first mentioned guides to seal the joint between said gaskets.

3. A hose coupling for cars comprising two identical sections, each section consisting of a hanger provided with an inclined guide, a body formed with a coupling head, said body being slidable on said hanger and guide and provided with a passageway opening at the face of the head and extending therethrough, a gasket in said head surrounding the opening of said passageway, a catch on said head, a dog pivotally mounted on the head and means for automatically locking and unlocking said dog, said sections being adapted to be connected with each other by engagement of their dogs and catches and to be tilted to force their gaskets together, whereby the joint between said passageways is sealed.

4. A hose coupling for cars comprising two identical sections adapted to abut against each other, each section consisting of a hanger and a body formed with a coupling head, said body being slidable vertically and longitudinally on said hanger and provided with a passageway opening at the face of said head, and a guide on said hanger adapted to tilt said body whereby the openings in the heads of abutting sections are registered and the joint between said openings sealed.

5. A hose coupling for cars comprising two identical sections, each section consisting of a hanger having an upwardly inclined guide thereon, blocks pivotally and slidably mounted on said hanger, a body formed with a coupling head, said body being slidably supported on said blocks and guide and provided with a passageway opening at the face of the head and extending therethrough, a dog pivoted on said head, means for locking and unlocking said dog and a catch on said head for engaging the dog of its companion section.

6. A hose coupling for cars comprising two identical sections, each section consisting of a hanger having an upwardly inclined guide thereon, blocks pivotally and slidably mounted on said hanger, a body formed with a coupling head, said body being slidably supported on said blocks and guide and provided with a passageway opening at the face of the head and extending therethrough, a dog pivoted on said head and provided with a stop, a rod movable into the path of said stop for locking the dog and a catch on said head for engaging the dog of its companion section.

7. A hose coupling for cars comprising two identical sections, each section consisting of a hanger having an upwardly inclined guide thereon, blocks pivotally and slidably mounted on said hanger, a body formed with a coupling head, said body being slidably supported on said blocks and guide and provided with a passageway opening at the face of the head and extending therethrough, a guide on the head, a dog pivoted on said head and provided with a stop, a rod movable into the path of said stop for locking the dog and a catch on said head for engaging the dog of its companion section.

8. A hose coupling for cars comprising two identical sections, each section consisting of a hanger having an upwardly inclined guide thereon, blocks pivotally and slidably mounted on said hanger, a body formed with a coupling head, said body being slidably supported on said blocks and guide and provided with a passageway opening at the face of the head and extending therethrough, a dog pivoted on said head and provided with a stop, a rod slidable on the body and formed with a lug designed to engage one of said blocks, a spring on the rod adapted to normally hold the same in the path of said stop to lock the dog, and a catch on said head for engaging the dog of its companion section.

9. A hose coupling for cars comprising two identical sections, each section consisting of a hanger having an upwardly inclined guide thereon, blocks pivotally and slidably mounted on said hanger, a body formed with a coupling head, said body being slidably supported on said blocks and guide and provided with a passageway opening at the face of the head and extending therethrough, a dog pivoted on said head and provided with a stop, a rod slidable on the body, a spring on the rod adapted to normally hold the same in the path of said stop to lock the dog, a guide on the head formed with a groove to receive the dog of its companion section and a yielding catch on said guide adapted to engage said dog.

ARCHIE G. MAULE.

Witnesses:
A. M. CROWELL,
MYRTLE PRATHER,
ELIZABETH MURPHY.